Dec. 16, 1958 — L. H. CARR — 2,864,401
VALVE STRUCTURE
Filed Aug. 15, 1955 — 3 Sheets-Sheet 1
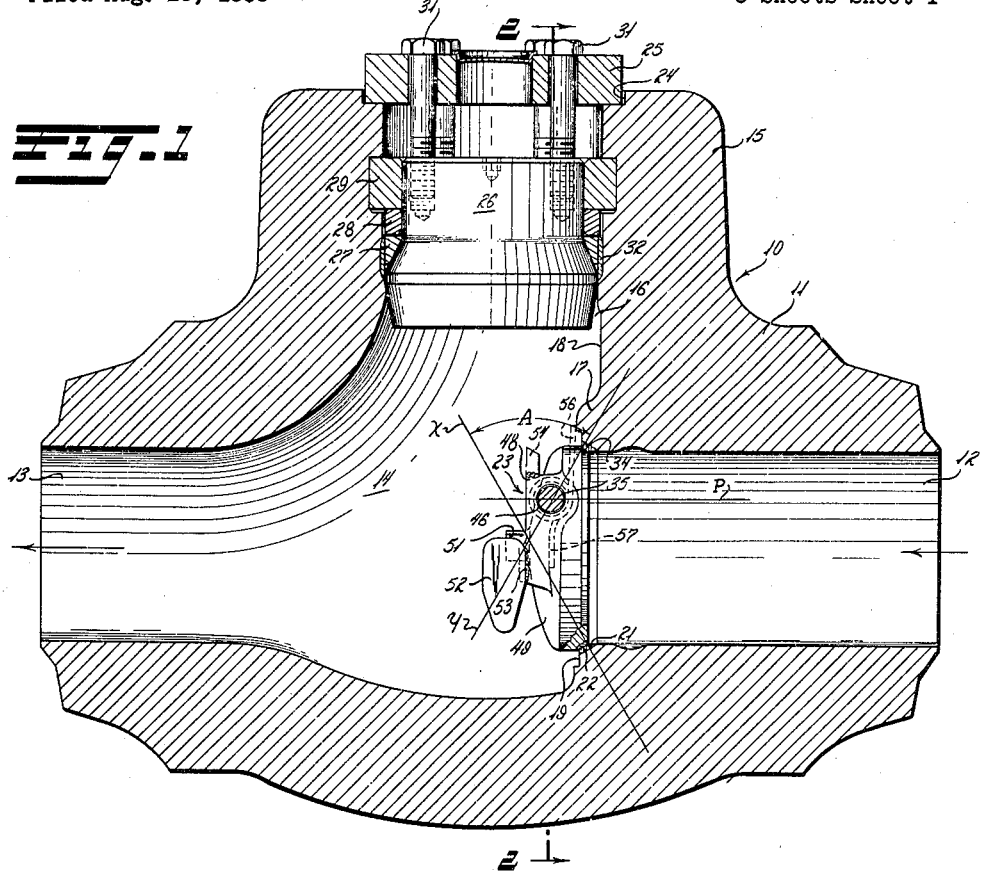
Fig. 1
Fig. 2
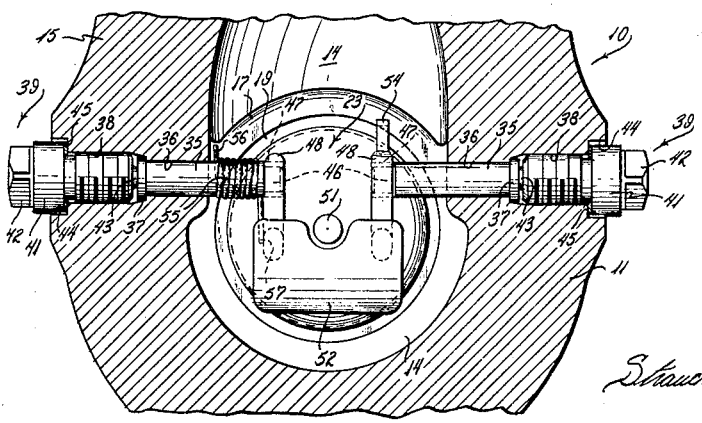
INVENTOR
LAURENCE H. CARR
ATTORNEYS Dec. 16, 1958 L. H. CARR 2,864,401
VALVE STRUCTURE
Filed Aug. 15, 1955 3 Sheets-Sheet 2

INVENTOR
LAURENCE H. CARR
BY Strauch, Nolan & Diggins
ATTORNEYS

Dec. 16, 1958  L. H. CARR  2,864,401
VALVE STRUCTURE
Filed Aug. 15, 1955  3 Sheets-Sheet 3

INVENTOR
LAURENCE H. CARR

BY Stauch, Nolan + Diggins
ATTORNEYS

United States Patent Office 2,864,401
Patented Dec. 16, 1958

2,864,401

VALVE STRUCTURE

Laurence H. Carr, Homewood, Ill., assignor, by mesne assignments, to Edward Valves, Inc., East Chicago, Ind., a corporation of Delaware Application August 15, 1955, Serial No. 528,210

2 Claims. (Cl. 137—527.8)

This invention relates to improvements in pivoted disk valves adapted for use as check valves and more particularly to improvements in the disposition of the seat and the mounting and construction of the valve disk. This application is a continuation-in-part of copending application Serial No. 455,816 filed September 14, 1954, and now abandoned, by Laurence H. Carr for Valve Structure.

Valves of this general character have heretofore been proposed as will be clear from consideration of United States Letters Patents 1,744,798 issued January 28, 1930, to O. A. Price, 2,262,726 issued November 11, 1941, to E. K. Nickerson and 2,268,518 issued December 30, 1941, to G. E. Sonderman et al. While the geometry and basic principles of such valves was disclosed in the 1930 Price patent, manufacturing considerations, field usage and maintenance factors and the need for rapid response of the valves to changing flow conditions to prevent noisy closing and water hammer conditions while assuring a low pressure drop in operation and positive sealing presented serious practical problems necessitating solution before general commercialization of such valves in high pressure systems was achieved. These practical considerations led ultimately to the inclined seat constructions of the Nickerson and Sonderman et al. patents, a commercial variation of which has for years been the generally accepted commercial structure. Present day manufacturing conditions resulting in high labor and high material costs, have spurred efforts to provide a less expensive non-slam, water hammer eliminating pivoted disk valve avoiding the expense of the large area inclined valve seat which utilizes excessive amounts of high cost seat metal and presents difficulties in machining due to the inclination of the seat and the valve body recesses for receiving the seat. The solution of this problem is not a simple one since check valves of this type, other than the prior commercial inclined seat valves, exhibit a tendency to slow check action and a decided tendency to slam upon final closing with consequent water hammer and pipe vibration.

It, accordingly, is a primary object of this invention to provide a pivoted disk valve having a valve and valve seat disposed in a plane normal to the liquid flow therethrough to minimize the quantity of expensive hardened seat metal required and obtain adequate flow area with a minimum seat bore and minimum diameter disk and including a valve member effectively positively biased toward closed position to simulate the quick non-slam, positive closing action of the prior commercial inclined seat valves irrespective of whether the valve is mounted for use in a horizontal pipe line or a vertical pipe line.

Still another object of the present invention resides in providing a pivoted disk valve in which the valve seat and valve are normal to the liquid flow and the pivot pin for the valve is disposed downstream from the downstream face of the valve disk and upstream from the effective center of gravity of the valve disk in a chordal plane spaced outwardly from the center of the valve seat at a distance equal to at least one-half the radius of the valve seat.

Still another object of the present invention is to provide a pivoted disk valve having a valve seat disposed normal to the passage of flow therethrough with a valve disk pivotally mounted on a pivot axis located as set forth in the preceding object with novel stop means to limit the lift of the valve from the seat to an angle of the order of 65° to the plane of the seat to maintain an effective gravitational closing force component while minimizing the pressure drop.

A further object of this invention resides in the provision of a pivoted disk valve having a one piece body providing aligned inlet and outlet bores intersecting an enlarged valve chamber, an integrally machined conical valve seat formed at the intersection of the inlet bore and enlarged valve chamber in a plane normal to the axis of the inlet bore, a valve disk mounted on pivot means offset to one side of the inlet bore axis with its pivot axis located upstream from the center of gravity of the valve disk and downstream from the valve seat.

Another object of the present invention resides in providing the valve of the preceding object with a valve disk of generally flat arcuate shape and uniform thickness in cross-section having a counterweight on its convex downstream face arranged to form a holder for chucking the valve disk during machining and yet seat lapping operations and lie out of the direct path of fluid flow through the open valve.

Still another object of the present invention is to provide the valve disk of the preceding object with a concave upstream surface generated on a radius slightly greater than the diameter of the valve seat to provide a relatively flat disk.

Still another object of the present invention resides in providing a pivoted disk valve having a valve seat disposed normal to the direction of flow therethrough and a pivoted valve disk with spring means for controlled biasing of the valve disk towards closed position to assure rapid closure upon cessation of normal flow and a positive tight sealing engagement with the seat irrespective of the position of the valve in use thereby minimizing the possibility of reverse fluid flow and water hammer upon closing operation of the valve.

Still further objects will appear as the description is read in conjunction with the appended claims and accompanying drawings wherein:

Figure 1 is a vertical sectional view through one form of valve made in accordance with this invention and mounted in a horizontal pipe line;

Figure 2 is a sectional view through the valve of Figure 1 taken substantially on line 2—2 of Figure 1;

Figure 3:
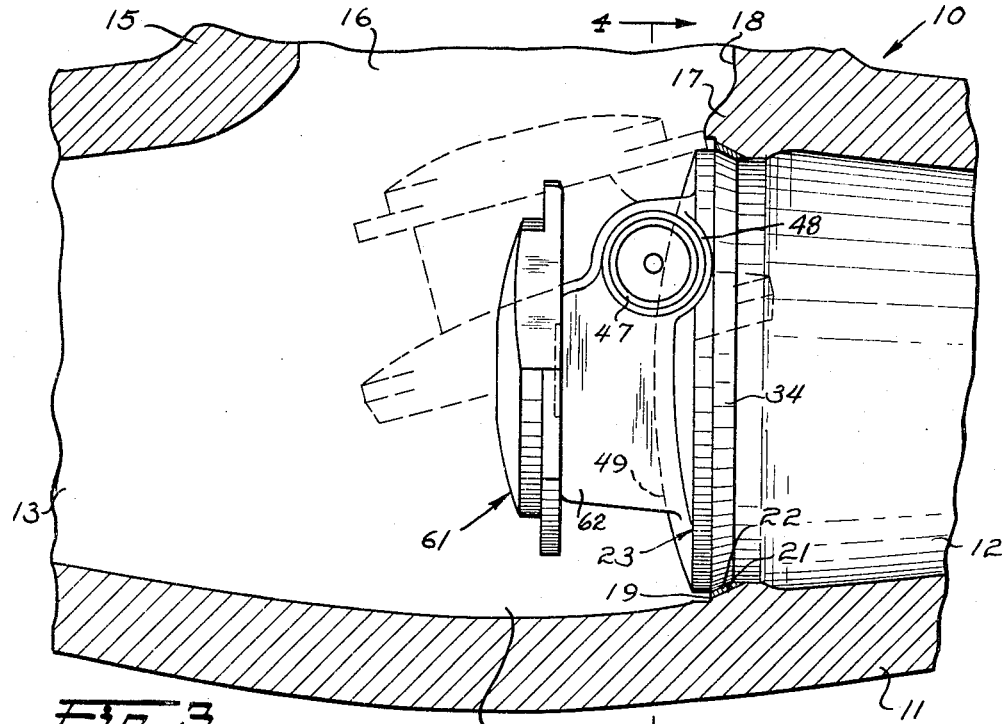
Figure 3 is a view similar to Figure 1 illustrating a preferred form of valve made in accord with this invention and adapted for use either as a horizontally or vertically mounted valve.

With continued reference to the drawings wherein the same parts throughout the several views are designated by the same reference numeral and with particular reference for the moment to Figures 1 and 2, there is illustrated a horizontally disposed pivoted disk valve 10 comprising a body 11 provided with aligned inlet and outlet ports 12 and 13, respectively, intersecting an enlarged valve chamber 14 at opposite sides thereof and a boss 15 right angularly disposed with respect to ports 12 and 13 and providing an access opening 16 intersecting the enlarged valve chamber 14 at right angles to the inlet and outlet ports 12 and 13. As clearly seen in Figure 1, the inner end of inlet port 12 enters valve chamber 14 through an annular boss-like formation 17 formed on the upstream wall 18 of chamber 14 in concentric relation to the axis of inlet port 12. Wall 18 is generally right angularly disposed with respect to inlet port 12 and the downstream face of boss 17 is suitably machined by means of a boring bar or the like entered through outlet port 13 to provide a recess having a machined face 19 right angularly disposed with respect to the axis of inlet port 12. Face 19 of boss 17 has a minimum diameter slightly greater than the maximum diameter of port 12 and the portion of the valve body connecting the inner diameter of face 19 and the wall of bore 12 is preferably tapered inwardly in an upstream direction as indicated at 21 and alloy coated to provide a relatively narrow width conical valve seat 22 the opposite peripheral ends of which intersect recess face 19 and the wall of port 12 in planes disposed at right angles to the axis of port 12 to minimize the radial dimension of the valve seat. This narrow seat width and right angular disposition of the seat substantially reduces the amount of expensive seat metal required in a given size valve as compared to an inclined seat valve and disposes the seat so that it can be machined and produced by tools entered through outlet port 13 and avoids the need of a two part housing with its incident production expense and sealing problems.

While the taper angle of valve seat 22 varies in relation to the size of the inlet valve port, the inclination of the seat with respect to the axis of the inlet port 12 should be chosen in accord with the principles hereinafter pointed out to assure a minimum width seat 22 and proper location of the pivot axis of the valve disk, denoted generally by numeral 23, in position to assure substantial axial movement of the valve disk onto and off the seat in final closing and initial opening of the valve.

Access opening 16 provides a means for initially inserting the valve disk 23 and adjusting it for proper operation at the factory and also provides a ready means of access to the valve disk and its supporting pivots with the valve in a pipe line to enable field adjustments, cleaning and refurbishing of the valve disk and its seat or replacement of the valve disk in the field. To prevent leakage through access opening 16 the present embodiment of the invention contemplates that the outer end of the access opening be spot faced to provide a recess 24 for receiving cover retainer 25 of a sealing assembly of the type shown in United States Letters Patent 2,665,874 entitled Pressure Sealed Valves issued January 12, 1954, to D. MacGregor and made up of a pressure seal cover 26, pressure seal gasket 27, spacer ring 28, segmental gasket retainer ring 29 and cover retaining cap screws 31. As clearly appears from Figure 1, pressure seal gasket 27, which is made of iron, sealingly engages a corrosion resistant inlay 32 provided in the wall of access opening 16 in conventional manner. Since this sealing assembly forms no part of the present invention reference to the above-identified MacGregor patent may be had for a more complete disclosure of its construction and operation.

To assure proper functioning of the valve of the present invention, valve disk 23 must be constructed and pivotally mounted so it will, upon opening, move or drop away from seat 22 with a minimum of rubbing contact and flow interference and, when closing, move or drop onto seat 22 quickly and with a minimum of rubbing contact.

To accomplish this end, a very flat arch-shaped disk 23 is provided having a mating seating surface 34 formed on the upstream peripheral edge of the disk in the form of a conical surface complimentarily angularly related to the valve seat 22 and alloy coated. The pivot axis for disk 23 is then carefully located. To this end, the present invention contemplates axially aligned opposed pivot or hinge pins 35 of high alloy steel closely slidably received in bores 36 oppositely axially aligned and formed in the body 11 of the valve with their axes lying in a plane P off-set to one side of the axis of the inlet port 12 a distance at least equal to one-half the radius of the inlet bore. Such a location of the axes of the pivots 35 helps to minimize the tendency of the valve disc to hammer upon normal check valve closing operation when downstream flow of fluid is interrupted for any reason due to the resulting overbalance of weight of the open valve on the downstream side of the pivot axes. The axes of these bores is also carefully located downstream from the transverse plane of the seat 22 sufficiently to dispose the axes of the bores within the angle A formed by the intersection of lines X and Y respectively drawn normal to the plane of the seat face 22 through the upstream and downstream points of intersection of a plane normal to the plane P with the plane of the upstream and downstream ends of the seat 22 as taught by Price Patent 1,744,798.

While pins 35 may assume any desired form so long as they closely fit bores 36, the present embodiment of the invention contemplates headed hinge pins the heads 37 of which seat on the shoulder formed at the juncture of bores 36 and counterbores 38 tapped to receive hinge pin plugs 39. Each plug 39 has an enlarged annular portion 41 adjacent a wrench receiving head 42 and an axially extending bearing backing tip 43 having a flat face adapted to firmly bear against the heads 37 of pins 35 to tightly clamp the heads between plugs 39 and the shoulders at the outer end of bores 36. As clearly seen in Figure 2, enlarged annular portions 41 of plugs 39 are received in spot faced recesses 44 provided in the valve body 11 in concentric relation to the axis of bore 36 and sealingly cooperate with hinge pin gaskets 45 clamped between the inner face of enlarged portions 41 and the end wall of spot faced recess 44.

The inner ends of pins 35 are preferably reduced in diameter to provide bearing portions 46 adapted to receive hardened hinge pin bearing sleeves 47 carried by upstanding, elongated, laterally spaced apertured bosses 48 formed on the downstream face of disk valve 23. The apertures in bosses 48 are axially aligned with their axes off-set to one side of the axis of the valve disk on a chordal plane spaced from the axis a distance equal to at least one half the radius of the valve inlet port 12. As clearly appears from Figure 1, laterally spaced bosses 48 extend along the convex downstream face 49 of valve disk 23 at opposite sides of the lateral center line of the disk in straddling relation to a coaxially formed riser 51 the peripheral face of which is accurately concentrically related to the base of seat 34 of the disk during the casting operation so as to provide a support surface for supporting disk 23 during final machining of the alloy coated seat and lapping operations.

While valve disk 23 may be produced in varying shapes in cross-section, it has been found that use of a relatively flat disk aids in keeping the pressure drop at a satisfactory low level. Accordingly, the disk of the present invention is preferably concavo-convex in cross-section with the upstream concave face preferably being generated around a center with a radius slightly exceeding the radius of the valve seat bore and the convex downstream face being generated around this same center to provide a disk of generally uniform thickness, as indicated by the dotted line showing in Figures 1 and 3.

Although a disk of this general construction, due to the lateral off-set relation of its pivot axis, will provide a closing force component when mounted in a horizontal pipe line as shown in Figure 1, it has been found desirable in practice to increase this closing force component to assure rapid and positive closing and reduce the tendency to water hammer. This may be conveniently done by attaching to the downstream face of the disc a suitably shaped and positioned counterweight such as that indicated by reference numeral 52. As clearly seen in Figure 1, counterweight 52 is located for the most part on the side of the axis of valve disk 23 opposite the pivot bores of bosses 48 and in downstream spaced relation to the downstream face 49 of disk 23 by securing it to bosses 48 through welding 53 or the like. Counterweight 52 of this embodiment extends slightly beyond the side faces of bosses 48 and is of maximum cross-sectional area at the edge adjacent the center of the disk and tapers inwardly at its other edge. Its downstream spacing from disc wall 49 is preferably chosen to assure the counterweight being disposed within the confines of the downstream projection of disc 23 to dispose the counterweight out of the direct flow of fluid through the open valve. To assure this end and also predetermine the most desirable full open valve position, the present embodiment of the invention provides a stop 54 welded or otherwise suitably secured to the upper end of one of the bosses 48 in position to engage the downstream face of boss 17. It has been determined by tests that opening movement of relatively flat valve disks designed as herein pointed out should preferably be limited to an angle of the order of 65° as indicated by the dot-dash line shown in Figure 1. While this limitation in lift of the valve somewhat increases the pressure drop in the fully opened position of the valve, it assures that the counterweight will not be introduced into the direct flow of the stream to cause an even greater pressure drop and serves to maintain the center of gravity of the counterweighted disk appropriately off-set downstream from the pivot axes to assure a maximum gravitational closing force moment with the valve mounted in either horizontal or vertical pipe lines.

While the biasing force to assure positive seating of the valve disk and minimize water hammer necessitates additional force to move the valve to fully opened position and results in some increase in the pressure drop because of the force required to open and maintain the disk open, the resulting increased pressure drop has been found wholly acceptable and justified by the saving of expensive seat metal resulting from utilization of a right angularly related valve seat and the minimization of water hammer.

To further minimize water hammer and effect a speed up in closing movement of the valve upon cessation of normal fluid flow through the valve mounted in a vertical pipe line where it has been found that the counter-weighted disk does not alone perform satisfactorily in the initial closing stages of movement, the present invention contemplates that a coiled torsion spring 55 be disposed in surrounding relation to at least one of the pivot pins 35 as shown in Figures 1 and 2 wherein one end 56 rests on the downstream face of boss 17 the other end 57 lies against the downstream face of valve 23 at the juncture of the downstream face and the adjacent boss 48. However such a spring cannot be too strong otherwise it will unduly increase the pressure drop factor. A suitable spring should be designed so that its maximum torsion exists at fully open valve position and about one-fourth of this maximum exists when the valve is closed. Such a spring force can be obtained in actual practice by providing a spring having an inch pound spring torque at full deflection equal to ⅜ of the weight in pounds of the valve disk.

While the valve of Figures 1 and 2 is shown in the drawings installed for operation as a horizontal valve, it will be appreciated that the valve could be effectively used without modification in a vertical pipe line installation.

Figure 4:
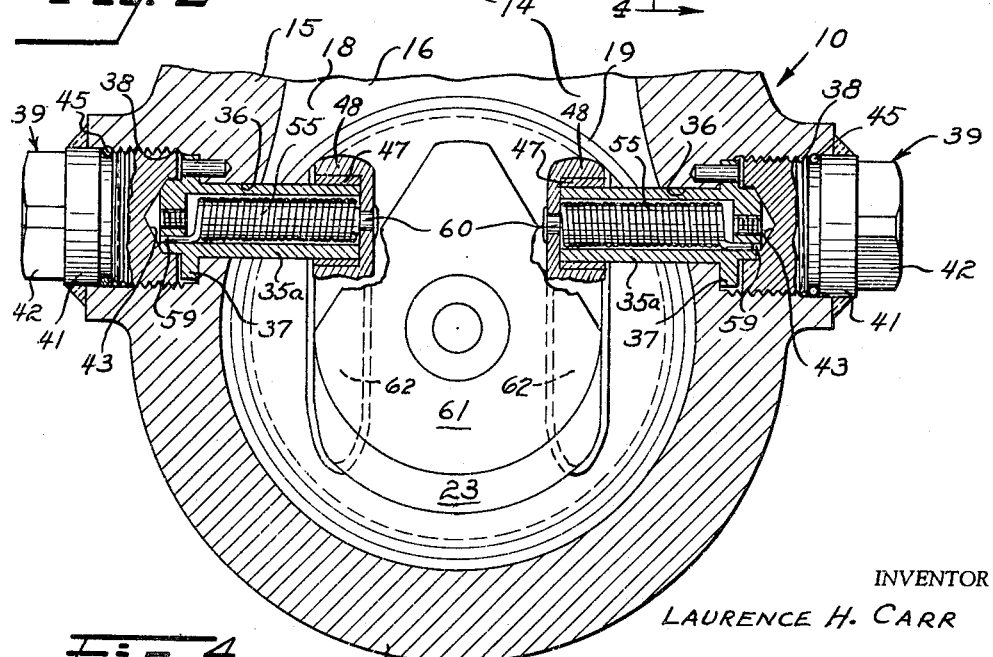
Figure 4 is a detailed sectional view taken substantially on line 4—4 of Figure 3.

A further and preferred embodiment of the invention is illustrated in Figures 3 and 4. Since many of the parts are identical to or full equivalents of the parts heretofore described, the same reference numerals have been applied thereto and the following description will be confined to pointing out the structural differences.

In this form of the invention, the torsion springs 55 are made of stainless steel and carefully designed to keep the stress in the spring in wide open position of the valve below 50,000 p. s. i. to assure long break free life. They are enclosed in hollow hinge pins 35a to guard against entrance of broken spring fragments into the main fluid line. Hinge pins 35a are non-rotatably secured in the valve body by pins 58 and are drilled at 59 to receive one end of spring 55 the other ends of which are secured by rivets 60 to journal bosses 47 of disk 23. The optimum torque of the two springs in this form of the invention in a typical 6 inch, 1500 lb. valve at wide open position is 7 in. lbs. (3½ in. lbs. for each spring for approximately 100 degrees uncoiling movement). In fully closed position, the springs will exert a closing torque of approximately 1¾ in. lbs. (⅞ in. lbs. per spring). This provides .03 in. lbs. per spring degree or a total of .07 in. lbs. per degree for the pair of springs.

The preferred valve of this embodiment, is provided with an extremely flat disk element 23 and, therefore, requires a counterweight 52 offset in a downstream direction from the pivot axes to properly locate the center of gravity of the valve element to the downstream side of the valve seat in horizontal pipe line usage and toward the center line of the valve seat in vertical pipe line usage. This embodiment of the counterweight takes the form of a segment of a more or less flat disk 61 having a wedge shaped configuration in outline concentrically related to a center line of disk 23 normal to the pivot axes with the enlarged arcuate shaped end overlying the area of disk 23 opposite that containing the hinge pin bosses and the smaller end terminating at a point approximately opposite the axes of the hinge pin bosses 48. Suitable ribs 62 extending along the convex face of disk 23 from the bosses 48 support counterweight 61 in its downstream spaced relation to disk 23. Due to its concentric relationship and shape, counterweight 61 is used as a holder for chucking the valve element for machining its Stellite sealing seat and rotating and guiding the valve element during the seat lapping operation. The small end of the counterweight is also relied upon to abut the valve casing and limit the opening movement of the valve.

The 6 inch 1500 lb. valve formed as disclosed in this embodiment of the invention in comparative tests with a comparable commercially acceptable inclined seat valve used as a standard showed the following comparative characteristics using a frequently encountered commercial water velocity of from 0–12 feet per second at 200° F., a flow reversal condition consisting of a change from 8 feet per second forward to 8 feet per second backward in a time interval of 1 second and .15 in. lbs. per degree for the spring pair:

| Description of Valve | Noise | | Pressure Drop (p. s. i.) at 4 and 8 ft./sec. flow | |
|---|---|---|---|---|
| | Vert. pos. | Horiz. pos. | Vert. pos. | Horiz. pos. |
| Inclined seat | 1.0 | 1.0 | .4 −.7 | .390−.720 |
| Application valve | 1.0 | .6 | .410−.575 | .530−.620 |

The same valve using the counterweight but omitting the light spring gave the following comparative results under the same conditions:

| Description of Valve | Noise | | Pressure Drop (p. s. i.) at 4 and 8 ft./sec. flow | |
|---|---|---|---|---|
| | Vert. pos. | Horiz. pos. | Vert. pos. | Horiz. pos. |
| Inclined seat | 1.0 | 1.0 | .4–.7 | .390–.720 |
| Application valve | 4.0 | 1.0 | (*) | .320–.520 |

*Value not obtained.

The same valve without springs and without the counterweight gave the following comparative results under the same conditions:

| Description of Valve | Noise | | Pressure Drop (p. s. i.) at 4 and 8 ft./sec. flow | |
|---|---|---|---|---|
| | Vert. pos. | Horiz. pos. | Vert. pos. | Horiz. pos. |
| Inclined seat | 1.0 | 1.0 | .4 –.7 | .390–.720 |
| Application valve | 2.00 | (*) | .158–.505 | (*) |

*Value not obtained.

The same valve without the counterweight but using the proper springs gave the following comparative results under the same conditions:

| Description of Valve | Noise | | Pressure Drop (p. s. i.) at 4 and 8 ft./sec. flow | |
|---|---|---|---|---|
| | Vert. pos. | Horiz. pos. | Vert. pos. | Horiz. pos. |
| Inclined seat | 1.0 | 1.0 | .4–.7 | .390–.720 |
| Application valve | .8 | 1.3 | .4–.505 | .470–.530 |

From the foregoing comparisons, it will be readily apparent that the present invention provides a pivoted disk valve having a one piece housing providing a right angularly disposed and readily machinable seat that is commercially competitive from a noise and pressure drop point of view in both horizontal and vertical pipe line usage. It is further apparent from these comparisons, that satisfactory comparative results are obtained in both pipe line usages only if the counterweight and spring are used together in the right angular seat valves of the present invention. When so used in the preferred form of the invention, the resulting valve at velocities below 8 feet per second never exceeds the pressure drop of the competitive inclined seat valve by more than .2 lbs. In vertical service the water hammer is the same as the competing valve and in horizontal service only 60% of the noise of the competing valve is experienced. While the .15 in. lbs. used in these tests was suitable for the particular valve in question, much lower values may be satisfactorily employed, even down to .03 in. lbs. as noted above.

Figure 5:
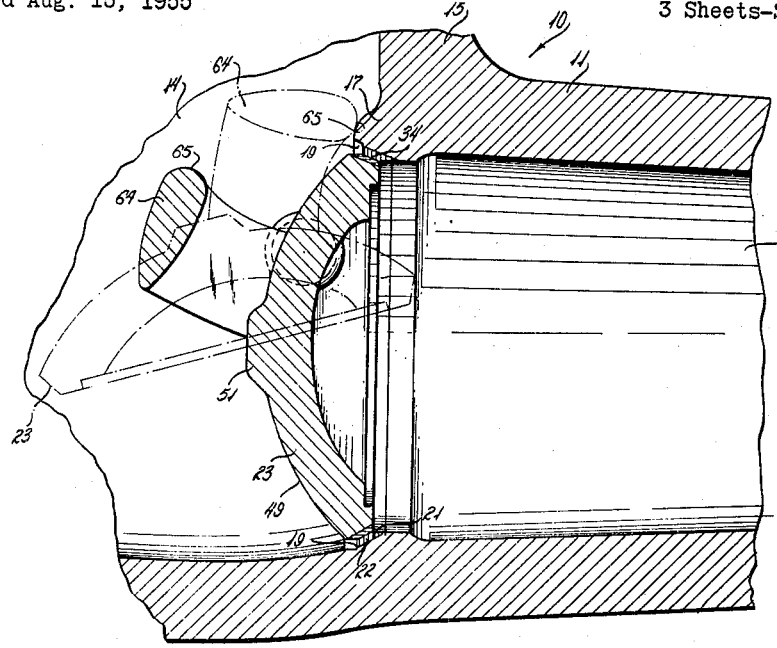
Figure 5 is a fragmental sectional view of a horizontally disposed valve similar to that of Figure 1 disclosing a modified form of valve disk.

Another variant of a counterweighted valve, designed for horizontal operation without a spring, is shown in Figure 5. In this embodiment the valve member has a somewhat higher arch and the counterweight constitutes a laterally extending bridge-like element 64 suitably welded to the upper ends of journal bosses 48 and spanning the distance between them. As shown the counterweight is disposed in downstream relation to the downstream wall 49 of the disk valve element 23 as in Figures 1 and 2. As clearly seen in Figure 5 the cross-sectional contour of bridging counterweight 64 is streamlined so that the normal flow of fluid through the open valve will undergo minimum interference. The end 65 of counterweight 64, as clearly appears in dot-dash lines in Figure 5, abuts the downstream face of boss 17 when valve 23 is opened to limit the opening movement of the valve and assure an effective closing moment.

Figure 6:
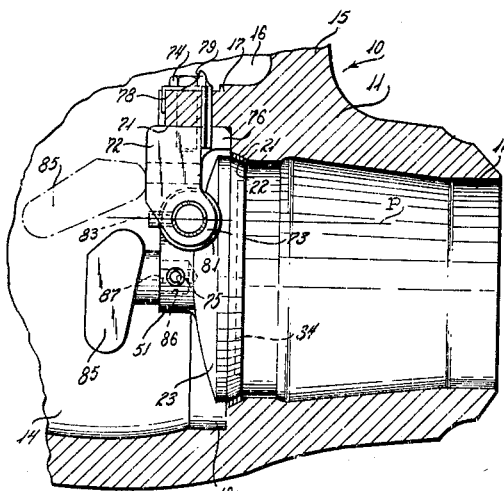
Figure 6 is a fragmental sectional view through a horizontally disposed valve made in accordance with the present invention and illustrating still another form of valve disk together with a modified pivot structure.
Figure 7:
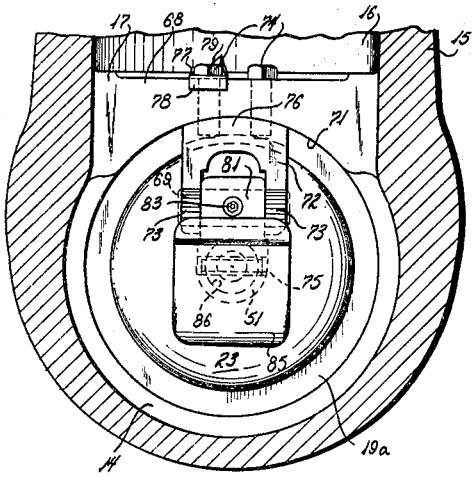
Figure 7 is a detailed sectional view taken substantially upon line 7—7 of Figure 6.

In Figures 6 and 7 of the drawings there is illustrated a further embodiment of the invention in which the boss 17 is spot faced to substantially greater depth to provide an annular recess 19a and is provided over the portion of its downstream face between access opening 16 and inlet bore 12 with a transversely disposed, downstream extending ledge 68 providing a mounting for a single hinge pin 69 employed in this form of the invention. As clearly seen in Figure 7, the spot facing operation which forms recess 19a also provides an arcuate, segmental, downwardly facing wall portion 71 in ledge 68, the arcuate surface of which constitutes a continuation of the cylindrical wall of recess 19a. In lieu of the valve body supported hinge pins 35 of the previous forms of this invention, the embodiment of Figures 6 and 7 contemplates a hinge pin support bracket 72 depending from ledge 68 and having bifurcated legs 73. Bracket 72 is rigidly secured to ledge 68 by means of cap screws 74. A press fitted locating and locking pin 75 of generally C-shaped configuration in cross-section is fitted in the respectively aligned bores in ledge 68 and bracket 72. Proper relative location of the axis of the locking pin bore, cap screw bores and hinge pin bores fixes the downstream location of the hinge pin axis in the plane P.

As clearly seen from Figure 7, one of the screws 74 is locked in its home position by means of a lock plate 77 having one end 78 turned downwardly over the front face of ledge 68 and a corner 79 turned up into engagement with the adjacent flat on the hexagonal head of the cap screw 74.

In this further embodiment of the invention, the riser 51 of the valve member 23 is elongated toward one edge of the disk valve element 23 along a diametrical plane to provide a single centered journal boss 81 laterally dimensioned to freely fit between the bifurcated legs 73 of bracket 72. Hinge pin 69 extending through the bifurcated arms 73 and journal boss 81 is non-rotatably secured to boss 81 by means of a set screw 83 so pin 69 and valve element 23 rotate as a unit in the journal bores provided in arms 73.

Counterweight 85 of this form of the invention is preferably removably associated with the riser 51 of disc element 53 by means of a locking pin 75 similar to that heretofore described which passes diametrically through the wall of riser 51, an axially extending recess 86 in riser 51 and the reduced mounting stem 87 of counterweight 85. As clearly appears from Figure 6 of the drawings, counterweight 85 is elongated in the direction of the long axis of riser 51 and in cross-section is streamlined in a direction to assure free fluid flow through the valve and past the counterweight when the valve is in open position.

Referring again to Figure 7, it will be noted that the counterweight is generally rectangular in shape with the most substantial area of the counterweight located to the side of the axial centerline of the valve element 23 opposite that containing journal boss 8. As a consequence, this counterweight, like that of the previously described embodiments of the invention, assures a positive closing moment of the disk valve upon cessation of normal fluid flow through the valve. It will furthermore be appreciated from the dot-dash line showing of Figure 6 that counterweight 85 serves also as a limiting stop to determine the open valve position of the valve. This stop function is accomplished by engagement of the rounded nose 87 of counterweight 85 with the downstream edges of the depending bifurcated legs 73 of bracket 72. By proper proportioning of the length of nose 87, it will be appreciated that opening movement of the valve may be limited to any selected degree of valve opening. However, in accord with the teachings of this invention it is preferred that the opening angle be of the general order of 65°.

From the preceding description, it will be apparent that the present invention not only minimizes the amount of expensive seat metal required in the formation of the valve seat by reason of the decrease in diameter of the seat, but, also, due to the fact that the base of the seat is formed by direct machining of the internal corner of inlet bore 12 to the desired inclination, permits the seat metal to be applied as a mere coating rather than a separate ring still further conserving expensive seat metal. It will also be appreciated from an inspection of Figures 3, 5 and 6 that the right angularly disposed valve seat arrangement of this invention assures, in a given class of valves, a substantially narrower valve seat than would be obtainable if an inclined seat like that of the prior commercial valves is utilized.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A tilting disk check valve comprising a one piece body providing a valve chamber intersected by oppositely directed aligned inlet and outlet ports and an angularly related access opening, said inlet port being recessed at its inner chamber end to provide a conical seat right angularly related to the axis of said inlet port; pivot means located in said valve chamber downstream from said conical seat and inwardly of the inner end of said access opening with its axis lying in a chordal plane of said valve chamber normal to the plane of said valve seat, offset to one side of the axis of said inlet port and delimited by the acute included angle of a pair of intersecting lines respectively drawn normal to said seat face through the upstream and opposite downstream points of intersection of said seat face by a plane containing the axis of the inlet port; a disk valve element having a conical seating surface formed on its peripheral upstream edge to matingly engage said valve seat and journal means on its downstream face with its pivot axis offset to one side of the valve element centerline at a distance equal to the offset of said axis of said pivot means from the inlet port axis, said journal means being effective to pivotally suspend said disk valve element from said pivot means between said conical seat and said pivot axis of said pivot means in closed valve position; counterweight means fixedly mounted on said disk valve element in a position to shift the effective center of gravity of said disk valve element and its fixedly mounted counterweight means to the downstream side of said pivot axes in the normal closed position of said disk valve element thereby assuring a closing force moment for said disk valve element upon cessation of normal fluid flow from said inlet port to said outlet port; and means for closing said access port against leakage of fluid therethrough.

2. The valve of claim 1 together with spring means housed in said pivot means and operatively connected to said valve body and to said disk valve element to bias said disk valve element toward closed position under a spring force progressively decreasing from a predetermined maximum at full open position to a predetermined minimum at fully closed position to assure a positive closing moment upon cessation of normal flow, a positive tight sealing engagement with the valve seat in closed position and, in event of breakage of said spring means, isolation of broken spring pieces from the passages of said valve.

References Cited in the file of this patent

UNITED STATES PATENTS

| | | |
|---|---|---|
| 468,985 | Downs | Feb. 16, 1892 |
| 1,337,326 | Rice | Apr. 20, 1920 |
| 1,744,798 | Price | Jan. 28, 1930 |
| 1,857,514 | Morrison | May 10, 1932 |
| 2,268,518 | Sonderman | Dec. 30, 1941 |
| 2,368,149 | Lee | Jan. 30, 1945 |
| 2,482,198 | Melichar | Sept. 20, 1949 |
| 2,556,904 | Cline | June 12, 1951 |
| 2,578,590 | Perrault | Dec. 11, 1951 |
| 2,711,188 | Nickerson | June 21, 1955 |

FOREIGN PATENTS

| | | |
|---|---|---|
| 1,023,342 | France | of 1952 |